United States Patent [19]
Maselli et al.

[11] 3,764,564
[45] Oct. 9, 1973

[54] CATALYST FOR CONTROL OF AUTOMOBILE EXHAUST EMISSIONS

[75] Inventors: James Michael Maselli, Ellicott City; Michael Vance Ernest, Baltimore; Gwan Kim, Columbia, all of Md.

[73] Assignee: W. R. Grace & Co., New York, N.Y.

[22] Filed: May 11, 1972

[21] Appl. No.: 252,363

[52] U.S. Cl................. 252/465, 252/467, 252/471, 252/475
[51] Int. Cl......................... B01j 11/06, B01j 11/32
[58] Field of Search..................... 252/465, 458, 471

[56] References Cited
UNITED STATES PATENTS
3,295,918  1/1967  Briggs et al.................... 252/465 X
3,532,457  10/1970  Koepernik..................... 252/465 X Primary Examiner—C. F. Dees
Attorney—Joseph P. Nigon et al.

[57] ABSTRACT

A process for preparing an automotive exhaust catalyst capable of converting the carbon monoxide and hydrocarbons in automobile exhaust gas to carbon dioxide and water, characterized by high activity and exceptional resistance to shrinkage in use. The catalyst is prepared by impregnating or cladding nodules of a support with certain transition metal oxides. One of these oxides is impregnated into or clad onto the support and the support is calcined prior to addition of the other catalytic components to the nodules.

4 Claims, No Drawings

CATALYST FOR CONTROL OF AUTOMOBILE EXHAUST EMISSIONS

BACKGROUND OF THE INVENTION

The recent emphasis on the preparation of catalysts capable of converting the noxious components of automobile exhaust gases to innocuous entities has been the subject of intensive research. A catalyst useful for control, of automobile exhaust must have several characteristics. It must, of course, be active for conversion of hydrocarbons and carbon monoxide to water and carbon dioxide over a long period of time under a wide variety of conditions and a wide range of temperatures.

The temperature in the catalytic converter of an automobile muffler ranges from ambient temperatures, which varies widely throughout the year, to temperatures in excess of 1800°F. The catalyst must be able to withstand changes in temperatures from below zero in some cases to above 1800°F over relatively short periods of time and still remain active. In addition, the catalyst must be resistant to attrition and shrinkage.

A catalyst that shrinks in excess of 10% when exposed to temperatures of about 1800°F is of limited usefulness as an auto exhaust conversion catalyst. If 10% of the muffler is void space, it is obvious that a substantial portion of the exhaust gases can by-pass the catalyst. In addition, this void space leads to a problem of excessive attrition of the catalyst and a loss of a portion of the catalyst from the muffler as fines.

Several catalysts have been disclosed that are active for conversion of hydrocarbons and carbon monoxide to carbon dioxide and water. U.S. Pat. No. 3,295,918 for example, describes a typical automobile exhaust conversion catalyst containing manganese oxide, copper oxide, chromium oxide, and palladium on an alumina support.

BRIEF DESCRIPTION OF THE INVENTION

We have found that a catalyst can be prepared which is active for the conversion of carbon monoxide and hydrocarbons in automotive exhaust gases dioxide carbon diozide and water and is also capable of resisting exposure to temperatures in the range of 1800°F for prolonged periods of time without shrinkage. The preparative process is one in which one of the catalytic metal oxides is impregnated or clad into the support followed by calcination at temperatures of 1700° – 1800°F followed by reimpregnation or recladding with the other catalytic components.

DETAILED DESCRIPTION OF THE INVENTION

The first step of our invention is the selection of a suitable catalyst base. The most commonly used and preferred base for automotive exhaust conversion catalysts in nodular form is alumina. Alumina is readily available on a commercial scale and is relatively inexpensive; however, other catalyst bases also give satisfactory results. Mullite and spinel have been successfully used as bases for catalysts of this type. In addition, nodules or silica-alumina, certain types of clays, titania, zirconia, etc., have also been used.

For purposes of simplicity, our invention will be described utilizing alumina as the base. Although it is obvious that other types of clays, titania, zirconia, etc., have also been used.

The next step of the process is the treatment of the base. In this step the base is contacted with an aqueous solution of a salt of alkaline earth, transition or rare earth metal to either impregnate or clad the nodules, extrudates, or monolith coating with the metal oxide. If a transition metal is used, it may be an active component of the catalyst or another metal that has little or no catalytic activity may also be employed. Examples of suitable metal oxides include the oxides of magnesium, calcium, barium, titanium, vanadium, chromium, manganese, iron, cobalt, nickel, copper, cerium, zinc, tungsten, and molybdenum. These metals are applied from a solution of water soluble salts of the metal. Any soluble salt will give satisfactory results in this step of the process. Examples of suitable salts includes the chlorides, acetates, nitrates, sulfates, citrates, etc.

The nodules of the base are either impregnated or clad with the metal oxides to a concentration of about two to 12 percent. The impregnation procedure involves application of a water soluble salt of the metal as an aqueous solution, to the alumina support.

The impregnated support is then dried at about 220°F and calcined for one to 10 hours preferably about two to four hours. The calcination must be carried out at a temperature of 1725° to 1850° if the desired effect is to be achieved. If the calcination is carried out above 1850°F the alumina densifies rapidly due to conversion to the alpha modification resulting in a decrease in surface area to below acceptable levels.

Cladding involves the application of an aqueous solution of a water soluble salt of the metal to the alumina support. The particles are maintained at a temperature of about 150° to 350°F. The water is flash evaporated from the surface of the nodules at this temperature, limiting the penetration of the metal salt and leaving the core of the alumina extrudates or nodules void of the metal salt. The nodules, extrudates, etc., of the support are then calcined at a temperature of 1725° to 1850°F, preferably 1750° to 1790°F for a period of about three hours.

This treatment of the catalyst support preshrinks the support and lays down a barrier on the support. This barrier inhibits the solid state interreaction of the catalytic components with the alumina which can cause deactivation and further shrinkage and attrition problems.

After the alumina base has been subjected to this pretreatment it is then impregnated or clad with solutions of the transition metals that show desirable catalytic activity. These transition metal oxides show promoted catalytic activity if small amounts of noble metals, such as, platinum, rhodium, or palladium are included in the formulation.

One particularly satisfactory catalyst is the copper-chrome-manganese catalyst described previously. This catalyst is normally promoted with a small amount of palladium. Excellent carbon monoxide and hydrocarbon conversion is achieved if the catalyst contains from about 8 to 12 percent preferably 4 to 8 percent manganese dioxide ($MnO_2$) and 5 to 15 percent, preferably 8 to 12 percent copper and chromium (as $2CuO—Cr_2O_3$ or $Cu_2Cr_2O_4$). This catalyst is preferably promoted with a small quantity generally 0.01 to 0.04 percent, preferably 0.01 to 0.02 percent palladium.

The catalyst components are impregnated into or clad onto the support using essentially the same procedure as described above. When the components are impregnated, the pre-treated support is contracted with an aqueous solution of the soluble copper and chromium salts, such as, the nitrates or amine carbonates, for example, to prepare the 2CuO—Cr$_2$O$_3$ composition. The level of the copper and chromium oxides is normally within the range given above. The palladium may be added as a water-soluble salt at this step or separately after drying the 2CuO—Cr$_2$O$_3$ impregnated material. The final step in preparation of the catalyst involves calcination at temperatures of 1000° to 1400°F, preferably 1400°F for periods of about one to three hours, preferably about two hours.

When a cladding technique is used, the metal oxide clad alumina nodules, extrudates, etc., are again heated to a temperature of 150° to 350°F and contacted with a solution of a soluble copper and chromium salts to deposit the copper chrome composition, 2CuO.Cr$_2$O$_3$. The palladium can be added at this step, or it can be eliminated completely since this procedure results in a catalyst of exceptional activity, that does not require noble metal promotion.

The final step in the catalyst preparation is calcination at temperatures of about 1000° to 1400°F for periods of one to three hours, preferably, about 1400°F for two hours.

The catalysts made by either of the above procedures give very good carbon monoxide and hydrocarbon activity and shrink less than 10 percent by volume when exposed for 24 hours to a temperature of 1800°F. These types of compositions can also be used as nitrogen oxide catalysts providing the exhaust environment does not contain a large excess of oxygen.

The catalyst must have suitable crush strength to be useful in our novel system. The crush strength should be about 5 pounds, with a crush strength of seven to 10 pounds being preferred.

The crushing strength was measured by selecting at least 10 typical specimens. The tests was conducted by using a standard testing machine capable of control of constant rate-of-crosshead movements. The device was equipped with a drive mechanism, a supporting jig and a compressive tool for applying the load to the test specimen. The tool is so constructed that loading is axial within 1:1000 and applied to surfaces that are flat within 0.025 millimeters and parallel to each other in a plane normal to the vertical loading axis.

This original cross-sectional areas of the specimens are calculated and the crushing strength calculated by dividing the load carried by the specimens at the yield point by the original minimum cross-sectional area of the specimen. The results were expressed in pounds per square inch (pounds). The average of 10 specimens is reported as the crushing strength of the products.

Our novel catalyst was evaluated using the procedures described in detail in the Federal Register of July 1970 as modified by the instructions in the Federal Register of July 1971. Both of these publications are incorporated herein by reference.

Broadly speaking, this test is designed to determine the amount of hydrocarbons, carbon monoxide and oxides of nitrogen emitted in an automobile exhaust gas while simulating an average type trip in an urban area from a cold start. The test consists of an engine start up and vehicle operation on a chassis dynamometer through a specified driving cycle. A proportionate part of the diluted gas emissions is collected continuously for subsequent analysis using a constant volume sampler.

The dynamometer run consists of two tests performed after the vehicle has been cold soaked a minimum of 12 hours. The first test is performed from a cold start, after the soak period, and lasts for 1371 seconds. The vehicle is shut down for a ten minute period and then the second portion of the test is begun from a hot start and lasts 505 seconds. The exhaust emissions are analyzed for hydrocarbons by a flame ionization detector and for carbon monoxide and carbon dioxide by nondispersive infrared. Oxides of nitrogen are also analyzed by both nondispersive infrared and nondispersive ultraviolet spectroscopy. The actual amount of each pollutant emitted in grams per mile is calculated using the weighting factors and procedure given in the July, 1971 Federal Register.

Our invention is further illustrated by the following specific, but unlimiting examples:

EXAMPLE 1

Twenty three (23) kilograms of alumina extrudates sized to approximately 3×3 mm having a surface area of 250 m$^2$/g, a water pore volume of 1.0 cc/g and a bulk density of 0.5 g/cc were selected as the catalyst support. The support was impregnated to incipient wetness with 23 liters of an aqueous solution which contained enought manganese nitrate to give a concentration of 70 grams of MnO$_2$ per liter. The saturated alumina extrudates were dried at 300°F for at least four hours and then calcined for 4 hours at 1775°F. The manganese containing extrudates had a surface area of 50 m$^2$/g, a water pore volume of 0.5 cc/g and a bulk density of 0.62 g/cc after the calcination.

The calcinated manganese containing alumina was then impregnated with 2.3 liters of an amine carbonate solution containing the equivalent of 0.114 grams. CuO and 0.108 grams of Cr$_2$O$_3$ per ml of solution. The amine carbonate solution was prepared by dissolving cuprous oxide, Cu$_2$O, and ammonium dichromate, (NH$_4$)$_2$Cr$_2$O$_7$, in a saturated solution of ammonium carbonate in ammonium hydroxide. The saturated extrudates were then dried at 250°F for at least four hours.

After drying, 6.9 liters of palladium nitrate solution containing 0.8 grams of palladium per liter were applied to the catalyst. The material was dried for the last time at 250°F for four hours and then calcined for two hours at 1400°F. The final catalyst had a surface area of 40m$^2$/g and a bulk density of 0.7g/cc. The catalyst contained 6.0% MnO$_2$, 5.1% CuO, 4.9% Cr$_2$O$_3$, 0.02% Pd. The balance was the alumina support.

EXAMPLE 2

This example illustrates preparation of the catalyst by the cladding technique.

Six kilograms, dry basis, of approximately 3×3 mm gamma alumina extrudates similar to those used in Example 1 were heated to 250° to 300°F in a rotating mixing chamber. The alumina was maintained at that temperature while 5.7 liters of a manganese nitrate solution with a concentration equivalent to 5.6 grams of MnO$_2$ per liter was sprayed onto the surface of extrudates. This technique caused the water to evaporate rapidly and limited the penetration of the manganese salt into the support.

The clad nodules were then calcined at 1750°F for four hours. The core of the extrudates was essentially void of the manganese component.

Six kilograms of the manganese oxide clad alumina extrudates prepared as described above were heated to 250° to 300°F in a rotating mixing chamber. Three liters of an amine carbonate solution prepared as described in Example 1 and containing 0.114 grams of CuO and 0.108 grams of $Cr_2O_3$ per ml were applied to the rotating nodules maintained at temperatures of about 250° to 300°F. The water evaporated rapidly allowing only partial penetration of the copper and chrome components into the extrudate. The catalyst was activated by calcination at 1400°F for two hours. A cross section view of a representative sample of the clad extrudates revealed the catalytic oxides were concentrated around the exterior of the nodules leaving a core of essential pure alumina. The composition of the catalyst was 4.5% $MnO_2$, 5.1%, CuO, 4.9% $Cr_2O_3$ and the balance alumina. The bulk density was 0.71g/cc and crush strength 7.8 pounds.

EXAMPLE 3

The temperature used for the calcination of the manganese salt impregnated or clad alumina base is critical. Too low a temperature will give a final catalyst which will shrink excessively when exposed to high temperature. Too high a temperature will result in sintering with a reduction in strength, surface area, and subsequent loss in activity. The criticality of the calcination temperature was demonstrated in a series of runs in which the catalyst shrinkage was determined as a function of the calcination temperature of the manganese nitrate containing alumina base.

In these runs the catalyst composition and preparation were similar to those noted in Example 1 with the exception that the $MnO_2$ level was 5 percent. A total of 17 samples were prepared and the manganese nitrate containing alumina bases were calcined at temperatures of 1700°1750°, 1775°, and 1800°F for varying lengths of time. Each sample was then used to prepare a catalyst with the composition noted in Example 1. The 17 catalysts were exposed to a temperature of 1800°F for 24 hours and their volume percent shrinkage measured. The data are set out in Table 1.

| $MnO_2$-$Al_2O_3$ Base Treatment | Time of Treatment In Hours | Catalyst Volume Percent Shrinkage After Heating at 1800°F for 24 Hours |
| --- | --- | --- |
| A. Heated to 1700°F | 1.5 | 17 |
| | 3.5 | 16 |
| | 5.5 | 13 |
| | 8.5 | 13 |
| B. Heated to 1750°F | 1.5 | 16 |
| | 3.5 | 13 |
| | 4.5 | 11 |
| | 5.5 | 9 |
| | 6.5 | 6 |
| C. Heated to 1775°F | 1.0 | 13 |
| | 3.0 | 9 |
| | 4.0 | 5 |
| | 5.0 | 3 |
| D. Heated to 1800°F | 1.0 | 15 |
| | 2.0 | 9 |
| | 3.0 | 4 |

It is apparent from these data that the temperature and time of calcination of the $MnO_2$ containing alumina base is critical for control of catalyst shrinkage. Calcination at 1700°F for 8.5 hours produced a product that has an unacceptable shrinkage of 13 percent. In contrast, heating to 1775°F for only five hours produced a product with an acceptable shrinkage of only three percent.

EXAMPLE 4

Five liters of the catalyst prepared in Example 1 was evaluated for its ability to control the emission of carbon monoxide and hydrocarbons from an automobile. The method used to evaluate this catalyst was the procedure outlined previously that is set out in the Federal Register that describes the Environmental Protective Agency's standards for 1975. The run was completed on a chassis dynamometer using a 1970 Impala equipped with a 350 cubic inch V-8 engine as the test vehicle. The car without the catalyst had a hydrocarbon emission of 1.2 grams per mile and a carbon monoxide emission of 34 grams per mile. Passing the exhaust gases through the catalyst contained in a catalytic muffler reduced the hydrocarbon emission to 0.19 grams per mile and a carbon monoxide to 4.1 grams per mile.

EXAMPLE 5

The catalyst prepared according to the procedure described in Example 2 was evaluated using the same test procedure as in Example 4. The active components of the catalyst were 4.5 percent of manganese dioxide ($MnO_2$), 5.1 percent copper oxide (CuO), 4.9 percent chromium oxide ($Cr_2O_3$) and the balance alumina. This catalyst was unique in that it did not contain a palladium promoter. The test was run using five liters of catalyst on the same automobile used in the test described in Example 4. The hydrocarbon emissions in the exhaust gases were reduced to 0.19 grams per mile and the carbon monoxide to 4.2 grams per mile.

What is claimed is:

1. A process for preparing a catalyst for the conversion of carbon monoxide and hydrocarbon in the exhaust gases of internal combustion engines to carbon dioxide and water which comprises the steps of:
    a. contacting a nodular alumina support having the desired surface area, density, and porosity with a solution of a manganese salt,
    b. drying said nodules and heating for about one to 10 hours at temperatures between 1725° and 1800°F,
    c. impregnating the dried support with solutions of soluble salts of copper and chromium, in concentrations sufficient to provide two to 10 weight percent copper oxide and 2 to 10 percent chromium oxide in the final catalyst.
    d. drying, calcining, and recovering the catalyst.

2. The process according to claim 1 wherein the manganese coating is applied to only to the outer periphery of the nodules.

3. The process according to claim 1 wherein the manganese coating is applied by impregnation into the nodules.

4. The process according to claim 1 wherein the manganese salt is selected from the group consisting of the chloride, nitrate, acetate, and sulfate.

* * * * *